(12) United States Patent
Goldberg

(10) Patent No.: US 11,225,364 B2
(45) Date of Patent: *Jan. 18, 2022

(54) FOLDABLE SERVING UTENSILS

(71) Applicant: Brett I Goldberg, Burlingame, CA (US)

(72) Inventor: Brett I Goldberg, Burlingame, CA (US)

(73) Assignee: Brett I Goldberg ( * ) Notice: Subject to any disclaimer, the term of this patent is extended or adjusted under 35 U.S.C. 154(b) by 0 days.

This patent is subject to a terminal disclaimer.

(21) Appl. No.: 16/901,954

(22) Filed: Jun. 15, 2020

(65) Prior Publication Data
US 2020/0317412 A1 Oct. 8, 2020

Related U.S. Application Data

(63) Continuation-in-part of application No. 16/632,276, filed as application No. PCT/US2018/043926 on Jul. 26, 2018, now Pat. No. 11,134,802.

(60) Provisional application No. 62/862,131, filed on Jun. 16, 2019, provisional application No. 62/537,932, filed on Jul. 27, 2017.

(51) Int. Cl.
B65D 51/24 (2006.01)
B65D 5/54 (2006.01)
B65D 81/36 (2006.01)
A47J 43/28 (2006.01)

(52) U.S. Cl.
CPC .......... *B65D 51/246* (2013.01); *A47J 43/288* (2013.01); *B65D 5/54* (2013.01); *B65D 81/368* (2013.01)

(58) Field of Classification Search
CPC ........ B65D 5/42; B65D 5/246; B65D 77/245; B65D 81/36; A47G 21/04; A47G 21/001; A47G 21/02; A47G 21/045
USPC ................... 229/125.03, 906, 103; 426/115; 206/551, 45.2, 45.21, 45.23, 45.26; 220/212

See application file for complete search history.

(56) References Cited

U.S. PATENT DOCUMENTS

| 1,521,768 | A | * | 1/1925 | Edmund | A47G 21/04 30/328 |
| 2,598,987 | A | * | 6/1952 | Franzen | B65D 77/2016 215/228 |
| 3,931,925 | A | * | 1/1976 | Ruff | A47G 21/04 229/125.03 |
| 4,836,593 | A | * | 6/1989 | Cooley | A47G 21/001 206/525 |
| D571,162 | S | * | 6/2008 | Fite, IV | D7/642 |
| 8,695,828 | B2 | * | 4/2014 | Cross | B65D 51/246 220/212.5 |
| 2008/0048463 | A1 | * | 2/2008 | Selenke | E01H 1/1206 294/1.3 |

* cited by examiner

*Primary Examiner* — Christopher R Demeree
(74) *Attorney, Agent, or Firm* — Hamby Law Firm; Bruce W. Hamby

(57) ABSTRACT

This disclosure describes foldable serving utensils, such as serrated, partially serrated and unserrated spatulas and serving scoops, with sharp or dull edges, that can be comprised of bendable material that can be incised, scored, perforated and folded, such as cardboard, and that can be integrated into planar lids and surfaces of boxes and other containers, such as pizza boxes.

16 Claims, 10 Drawing Sheets

FOLDABLE SERVING UTENSILS

DESCRIPTION OF THE DISCLOSED EMBODIMENTS

The following exemplary embodiments are intended to provide further description of the invention so as to enable a person of ordinary skill in the art to make and use the full scope of the invention. They are not intended to be limiting.

First Exemplary Embodiment: A Partially Serrated Folding Spatula

Figure 1:
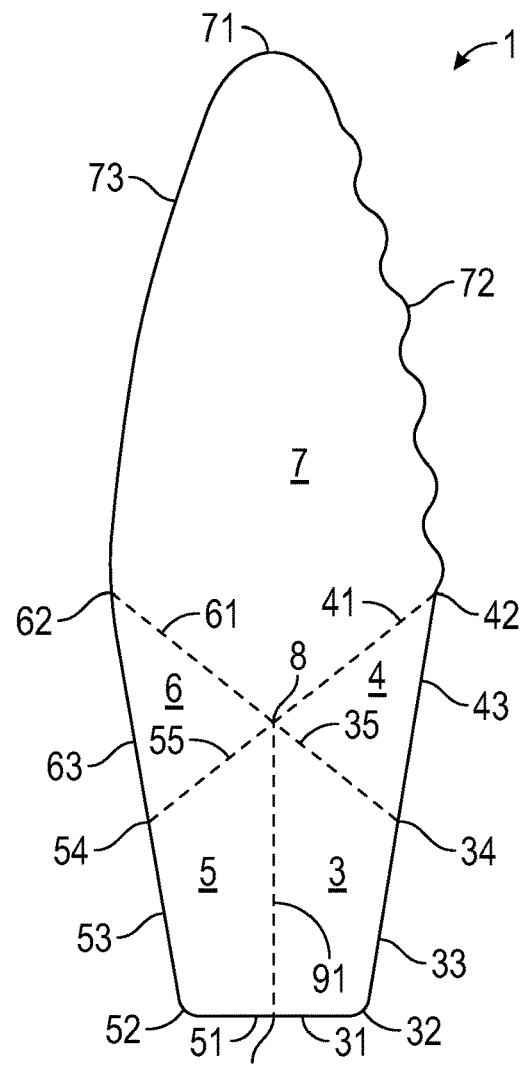
FIG. 1 is a top plan view of an embodiment, in one form, of a partially serrated foldable serving utensil.

FIG. 1 discloses an apparatus known as a partially serrated folding spatula (1). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 1 represents an incised, scored or perforated line that will allow the bendable material to easily bend along such line.

FIG. 1 shows a foldable handle, at least part of which is capable of being folded into a plane that is perpendicular to a serving surface (7), the foldable handle comprising a posterior right handle folding piece (3), an anterior right handle folding piece (4), a posterior left handle folding piece (5), an anterior left handle folding piece (6) and a handle bisecting incised line (91).

The posterior right handle folding piece (3) disclosed in FIG. 1 has boundaries that are comprised of a handle bisecting incised line (91); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (8).

The anterior right handle folding piece (4) disclosed in FIG. 1 has boundaries that are comprised of an incised line bisecting the right handle folding pieces (35); an incised line bisecting the right side of the handle from the serving surface (41), said incised line extending from the central focus point (8) to a right handle termination point (42); and a right side (43) extending from the right handle termination point (42) to the right handle bisecting point (34).

The posterior left handle folding piece (5) disclosed in FIG. 1 has boundaries that are comprised of a handle bisecting incised line (91); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (8).

The anterior left handle folding piece (6) disclosed in FIG. 1 has boundaries that are comprised of the incised line bisecting the left handle folding pieces (55); an incised line bisecting the left side of the handle from the serving surface (61), said incised line extending from the central focus point (8) to a left handle termination point (62); and a left side (63) extending from the left handle termination point (62) to the left handle bisecting point (54).

The handle bisecting incised line (91) disclosed in FIG. 1 extends from a posterior handle bisecting point (9) to a central focus point (8).

In addition, the embodiment disclosed in FIG. 1 possesses a serving surface (7) and a central focus point (8).

The serving surface (7) disclosed in FIG. 1 has boundaries that are comprised of the incised line bisecting the right side of the handle from the serving surface (41); the incised line bisecting the left side of the handle from the serving surface (61); an edge with serrations (72) extending from either the right handle termination point (42) to an anterior apex (71) or from the left handle termination point (62) to the anterior apex (71); and a nonserrated edge (73) extending from either the right handle termination point (42) to an anterior apex (71) or from the left handle termination point (62) to the anterior apex (71), whichever is not an edge with serrations (72).

The central focus point (8) disclosed in FIG. 1 is comprised of endpoints of the handle bisecting incised line (91); the incised line bisecting the right handle folding pieces (35); the incised line bisecting the right side of the handle from the serving surface (41); the incised line bisecting the left handle folding pieces (55); and the incised line bisecting the left side of the handle from the serving surface (61).

Figure 2:
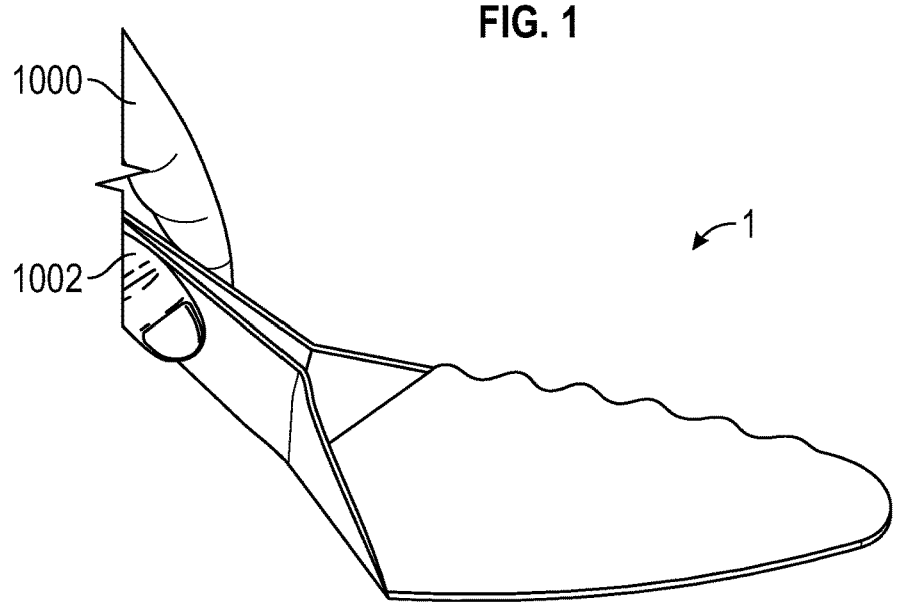
FIG. 2 is top right perspective of an embodiment, in one form, of a foldable serving utensil.

FIG. 2 discloses how a finger (1000) and a thumb (1002) can be used to fold the handle of the embodiment of the partially serrated folding spatula (1) so that it is ready for use as a food serving implement.

Second Exemplary Embodiment: A Folding Spatula with Serrations on Two Sides

Figure 3:
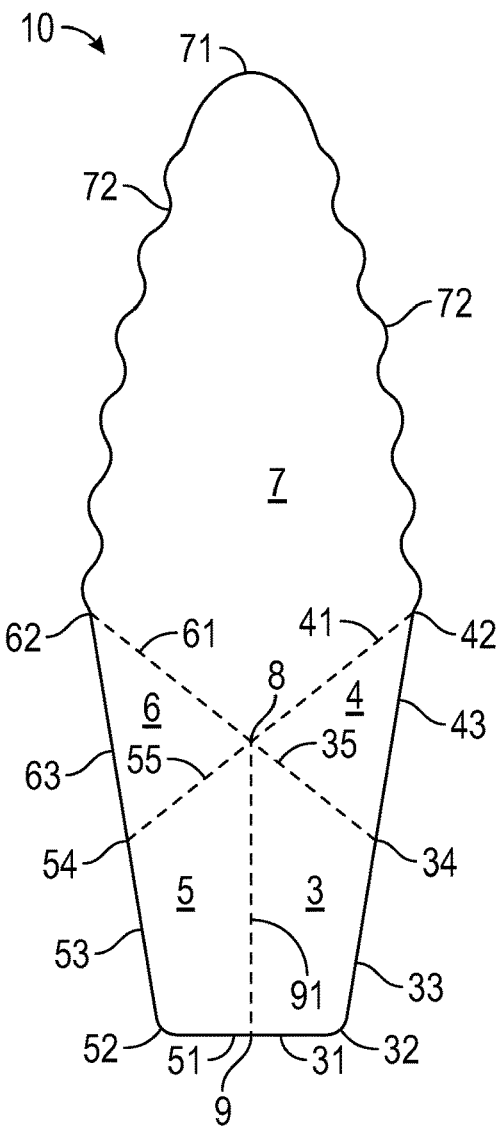
FIG. 3 is a top plan view of an embodiment, in one form, of a foldable serving utensil that is serrated on two sides.

FIG. 3 discloses an apparatus known as a folding spatula with serrations on two sides (10). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 3 represents an incised, scored or perforated line that will allow the bendable material to easily bend along such line.

FIG. 3 shows a foldable handle, at least part of which is capable of being folded into a plane that is perpendicular to a serving surface (7), the foldable handle comprising a posterior right handle folding piece (3), an anterior right handle folding piece (4), a posterior left handle folding piece (5), an anterior left handle folding piece (6) and a handle bisecting incised line (91).

The posterior right handle folding piece (3) disclosed in FIG. 3 has boundaries that are comprised of a handle bisecting incised line (91); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (8).

The anterior right handle folding piece (4) disclosed in FIG. 3 has boundaries that are comprised of an incised line bisecting the right handle folding pieces (35); an incised line bisecting the right side of the handle from the serving surface (41), said incised line extending from the central focus point (8) to a right handle termination point (42); and a right side (43) extending from the right handle termination point (42) to the right handle bisecting point (34).

The posterior left handle folding piece (5) disclosed in FIG. 3 has boundaries that are comprised of a handle bisecting incised line (91); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (8).

The anterior left handle folding piece (6) disclosed in FIG. 3 has boundaries that are comprised of the incised line bisecting the left handle folding pieces (55); an incised line bisecting the left side of the handle from the serving surface (61), said incised line extending from the central focus point (8) to a left handle termination point (62); and a left side (63) extending from the left handle termination point (62) to the left handle bisecting point (54).

The handle bisecting incised line (91) disclosed in FIG. 3 extends from a posterior handle bisecting point (9) to a central focus point (8).

In addition, the embodiment disclosed in FIG. 3 possesses a serving surface (7) and a central focus point (8).

The serving surface (7) disclosed in FIG. 3 has boundaries that are comprised of the incised line bisecting the right side of the handle from the serving surface (41); the incised line bisecting the left side of the handle from the serving surface (61); an edge with serrations (72) extending from the right handle termination point (42) to an anterior apex (71); and an edge with serrations (72) extending from the left handle termination point (62) to the anterior apex (71).

The central focus point (8) disclosed in FIG. 3 is comprised of endpoints of the handle bisecting incised line (91); the incised line bisecting the right handle folding pieces (35); the incised line bisecting the right side of the handle from the serving surface (41); the incised line bisecting the left handle folding pieces (55); and the incised line bisecting the left side of the handle from the serving surface (61).

Third Exemplary Embodiment: An Unserrated Folding Spatula

Figure 4:
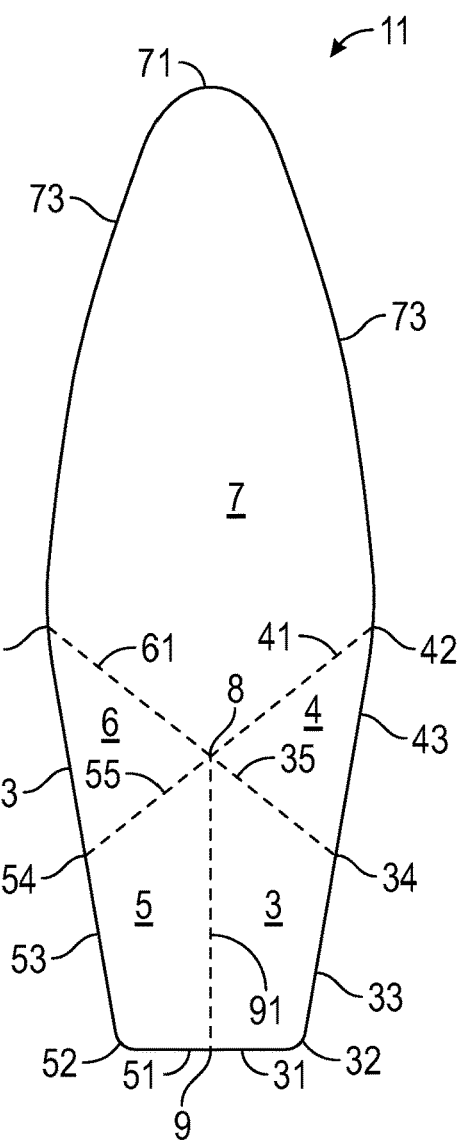
FIG. 4 is a top plan view of an embodiment, in one form, of an unserrated foldable serving utensil.

FIG. 4 discloses an apparatus known as an unserrated folding spatula (11). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 4 represents an incised, scored or perforated line that will allow the bendable material to easily bend along such line.

FIG. 4 shows a foldable handle, at least part of which is capable of being folded into a plane that is perpendicular to a serving surface (7), the foldable handle comprising a posterior right handle folding piece (3), an anterior right handle folding piece (4), a posterior left handle folding piece (5), an anterior left handle folding piece (6) and a handle bisecting incised line (91).

The posterior right handle folding piece (3) disclosed in FIG. 4 has boundaries that are comprised of a handle bisecting incised line (91); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (8).

The anterior right handle folding piece (4) disclosed in FIG. 4 has boundaries that are comprised of an incised line bisecting the right handle folding pieces (35); an incised line bisecting the right side of the handle from the serving surface (41), said incised line extending from the central focus point (8) to a right handle termination point (42); and a right side (43) extending from the right handle termination point (42) to the right handle bisecting point (34).

The posterior left handle folding piece (5) disclosed in FIG. 4 has boundaries that are comprised of a handle bisecting incised line (91); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (8).

The anterior left handle folding piece (6) disclosed in FIG. 4 has boundaries that are comprised of the incised line bisecting the left handle folding pieces (55); an incised line bisecting the left side of the handle from the serving surface (61), said incised line extending from the central focus point (8) to a left handle termination point (62); and a left side (63)

extending from the left handle termination point (62) to the left handle bisecting point (54).

The handle bisecting incised line (91) disclosed in FIG. 4 extends from a posterior handle bisecting point (9) to a central focus point (8).

In addition, the embodiment disclosed in FIG. 4 possesses a serving surface (7) and a central focus point (8).

The serving surface (7) disclosed in FIG. 4 has boundaries that are comprised of the incised line bisecting the right side of the handle from the serving surface (41); the incised line bisecting the left side of the handle from the serving surface (61); a nonserrated edge (73) extending from the right handle termination point (42) to an anterior apex (71); and a nonserrated edge (73) extending from the left handle termination point (62) to the anterior apex (71).

The central focus point (8) disclosed in FIG. 4 is comprised of endpoints of the handle bisecting incised line (91); the incised line bisecting the right handle folding pieces (35); the incised line bisecting the right side of the handle from the serving surface (41); the incised line bisecting the left handle folding pieces (55); and the incised line bisecting the left side of the handle from the serving surface (61).

Fourth Exemplary Embodiment: A Folding Spatula with a Split Handle

Figure 5:
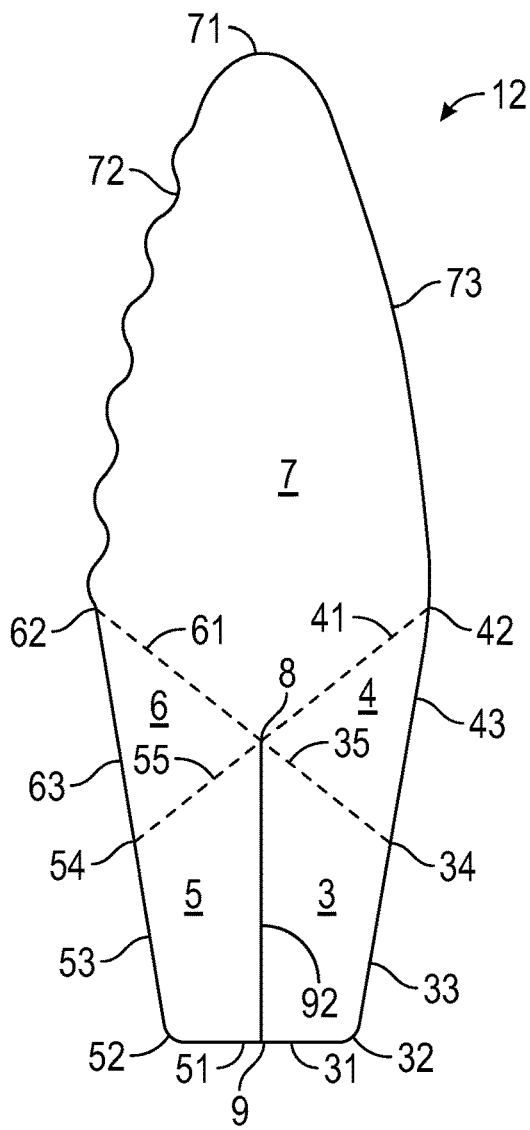
FIG. 5 is a top plan view of an embodiment, in one form, of a partially serrated foldable serving utensil with a slit handle.

FIG. 5 discloses an apparatus known as a folding spatula with a split handle (12). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 5 represents an incised, scored or perforated line that will allow the bendable material to easily bend along such line. Element 92, in FIG. 5, is a cut bisecting the posterior handle folding pieces, (3) and (5).

FIG. 5 shows a foldable handle, at least part of which is capable of being folded into a plane that is perpendicular to a serving surface (7), the foldable handle comprising a posterior right handle folding piece (3), an anterior right handle folding piece (4), a posterior left handle folding piece (5), an anterior left handle folding piece (6) and a cut bisecting the posterior handle folding pieces (92).

The posterior right handle folding piece (3) disclosed in FIG. 5 has boundaries that are comprised of the cut bisecting the posterior handle folding pieces (92); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (8).

The anterior right handle folding piece (4) disclosed in FIG. 5 has boundaries that are comprised of the incised line bisecting the right handle folding pieces (35); an incised line bisecting the right side of the handle from the serving surface (41), said incised line extending from the central focus point (8) to a right handle termination point (42); and a right side (43) extending from the right handle termination point (42) to the right handle bisecting point (34).

The posterior left handle folding piece (5) disclosed in FIG. 5 has boundaries that are comprised of the cut bisecting the posterior handle folding pieces (92); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (8).

The anterior left handle folding piece (6) disclosed in FIG. 5 has boundaries that are comprised of the incised line bisecting the left handle folding pieces (55); an incised line bisecting the left side of the handle from the serving surface (61), said incised line extending from the central focus point (8) to a left handle termination point (62); and a left side (63) extending from the left handle termination point (62) to the left handle bisecting point (54).

The cut bisecting the posterior handle folding pieces (92) disclosed in FIG. 5 extends from a posterior handle bisecting point (9) to a central focus point (8).

The serving surface (7) disclosed in FIG. 5 has boundaries that are comprised of the incised line bisecting the right side of the handle from the serving surface (41); the incised line bisecting the left side of the handle from the serving surface (61); an edge with serrations (72) extending from either the right handle termination point (42) to an anterior apex (71) or from the left handle termination point (62) to the anterior apex (71); and a nonserrated edge (73) extending from either the right handle termination point (42) to an anterior apex (71) or from the left handle termination point (62) to the anterior apex (71), whichever is not an edge with serrations (72).

The central focus point (8) disclosed in FIG. 5 is comprised of endpoints of the cut bisecting the posterior handle folding pieces (92); the incised line bisecting the right handle folding pieces (35); the incised line bisecting the right side of the handle from the serving surface (41); the incised line bisecting the left handle folding pieces (55); and the incised line bisecting the left side of the handle from the serving surface (61).

Figure 6:
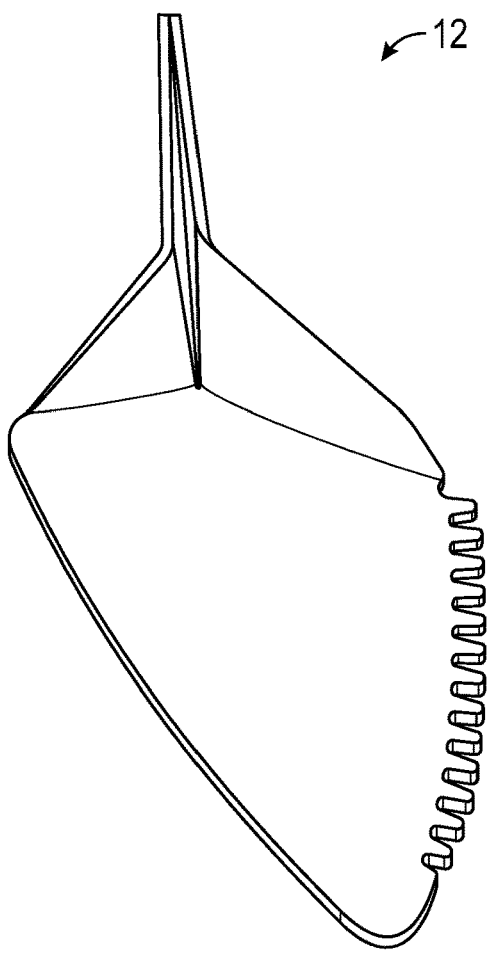
FIG. 6 is a top front perspective of an embodiment, in one form, of a partially serrated foldable serving utensil with a slit handle.

FIG. 6 discloses how the handle of the disclosed embodiment can be formed so that a folding spatula with a split handle (12) can be made ready for use as a food serving implement.

Fifth Exemplary Embodiment: A Folding Bull-Nosed Spatula

Figure 7:
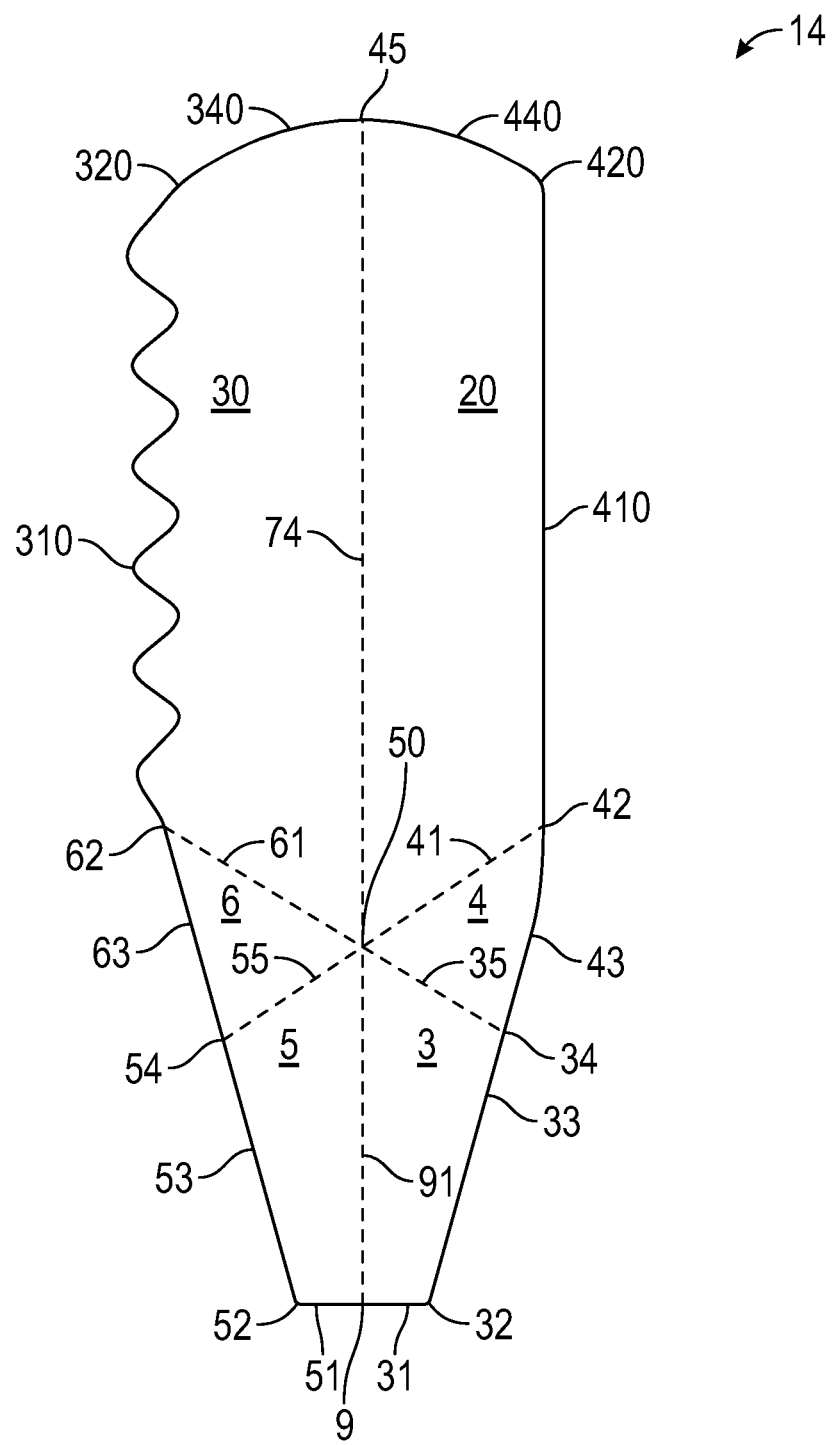
FIG. 7 is a top plan view of an embodiment, in one form, of a partially serrated foldable serving utensil with a rounded end.

FIG. 7 discloses an apparatus known as a folding bull-nosed spatula (14). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 7 represents an incised, scored or perforated line that will allow the bendable material to easily bend along such line.

FIG. 7 shows a foldable handle, at least part of which is capable of being folded into a plane that is perpendicular to a serving surface bisecting incised line (74), the foldable handle comprising a posterior right handle folding piece (3), an anterior right handle folding piece (4), a posterior left handle folding piece (5), an anterior left handle folding piece (6) and a handle bisecting incised line (91).

The posterior right handle folding piece (3) disclosed in FIG. 7 has boundaries that are comprised of the handle bisecting incised line (91); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (50).

The anterior right handle folding piece (4) disclosed in FIG. 7 has boundaries that are comprised of the incised line bisecting the right handle folding pieces (35); an incised line bisecting the right side of the handle from the serving surface (41), said incised line extending from the central focus point (50) to a right handle termination point (42); and a right side (43) extending from the right handle termination point (42) to the right handle bisecting point (34).

The posterior left handle folding piece (5) disclosed in FIG. 7 has boundaries that are comprised of the handle bisecting incised line (91); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (50).

The anterior left handle folding piece (6) disclosed in FIG. 7 has boundaries that are comprised of the incised line bisecting the left handle folding pieces (55); an incised line bisecting the left side of the handle from the serving surface (61), said incised line extending from the central focus point (50) to a left handle termination point (62); and a left side (63) extending from the left handle termination point (62) to the left handle bisecting point (54).

The handle bisecting incised line (91) disclosed in FIG. 7 extends from a posterior handle bisecting point (9) to a central focus point (50).

The exemplary embodiment of FIG. 7 further depicts a right serving surface (20) and a left serving surface (30).

The right serving surface (20) of FIG. 7 has boundaries that are comprised of the incised line bisecting the right side of the handle from the serving surface (41); the serving surface bisecting incised line (74) extending from the central focus point (50) to a point bisecting the anterior sides (45); an anterior right perimetric side (440) extending from the point bisecting the anterior sides (45) to the right anterior apex (420); and either an unserrated side (410) extending from the right handle termination point (42) to a right anterior apex (420) or a serrated side (310) extending from the right handle termination point (42) to a right anterior apex (420).

The left serving surface (30) of FIG. 7 has boundaries that are comprised of the incised line bisecting the left side of the handle from the serving surface (61); the serving surface bisecting incised line (74) extending from the central focus point (50) to a point bisecting the anterior sides (45); anterior left perimetric side (340) extending from the point bisecting the anterior sides (45) to the left anterior apex (320); and either an unserrated side (410) extending from the left handle termination point (62) to the left anterior apex (320) or a serrated side (310) extending from the left handle termination point (62) to the left anterior apex (320).

Sixth Exemplary Embodiment: A Folding Flat-Nosed Spatula

Figure 8:
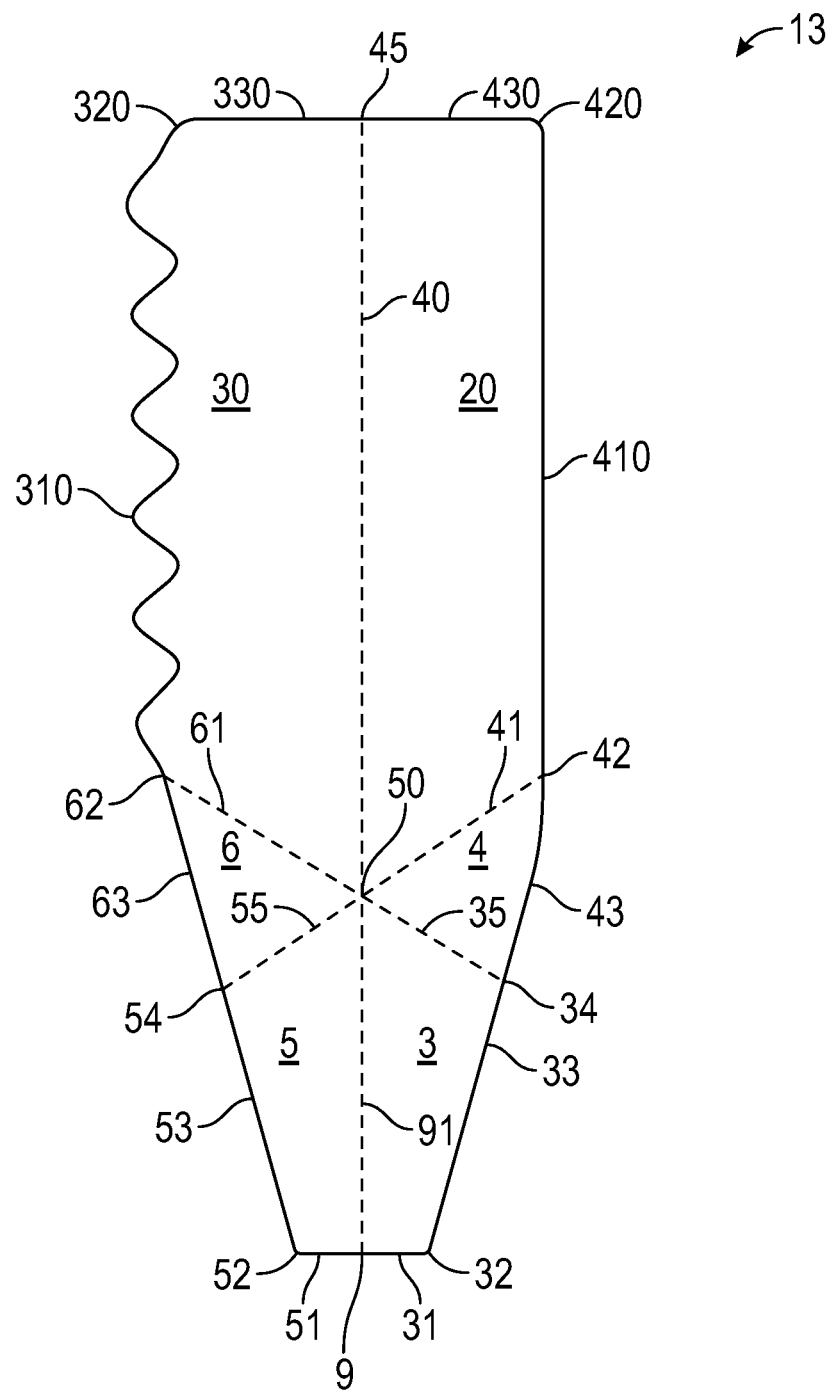
FIG. 8 is a top plan view of an embodiment, in one form, of a partially serrated foldable serving utensil with a flat end.

FIG. 8 discloses an apparatus known as a folding bull-nosed spatula (13). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 8 represents an incised, scored or perforated line that will allow the bendable material to easily bend along such line.

FIG. 8 shows a foldable handle, at least part of which is capable of being folded into a plane that is perpendicular to an incised line bisecting the left and right serving surfaces (40), the foldable handle comprising a posterior right handle folding piece (3), an anterior right handle folding piece (4), a posterior left handle folding piece (5), an anterior left handle folding piece (6) and a handle bisecting incised line (91).

The posterior right handle folding piece (3) disclosed in FIG. 8 has boundaries that are comprised of the handle bisecting incised line (91); a right posterior side (31) extending from the posterior handle bisecting point (9) to a right posterior apex (32); a right side (33) extending from the right posterior apex (32) to a right handle bisecting point (34); and an incised line bisecting the right handle folding pieces (35) extending from the right handle bisecting point (34) to the central focus point (50).

The anterior right handle folding piece (4) disclosed in FIG. 8 has boundaries that are comprised of the incised line bisecting the right handle folding pieces (35); an incised line bisecting the right side of the handle from the serving surface (41), said incised line extending from the central focus point (50) to a right handle termination point (42); and a right side (43) extending from the right handle termination point (42) to the right handle bisecting point (34).

The posterior left handle folding piece (5) disclosed in FIG. 8 has boundaries that are comprised of the handle bisecting incised line (91); a left posterior side (51) extending from the posterior handle bisecting point (9) to a left posterior apex (52); a left side (53) extending from the left posterior apex (52) to a left handle bisecting point (54); and an incised line bisecting the left handle folding pieces (55) extending from the left handle bisecting point (54) to the central focus point (50).

The anterior left handle folding piece (6) disclosed in FIG. 8 has boundaries that are comprised of the incised line bisecting the left handle folding pieces (55); an incised line bisecting the left side of the handle from the serving surface (61), said incised line extending from the central focus point (50) to a left handle termination point (62); and a left side (63) extending from the left handle termination point (62) to the left handle bisecting point (54).

The handle bisecting incised line (91) disclosed in FIG. 8 extends from a posterior handle bisecting point (9) to a central focus point (50).

The exemplary embodiment of FIG. 8 further depicts a right serving surface (20) and a left serving surface (30).

The right serving surface (20) of FIG. 8 has boundaries that are comprised of the incised line bisecting the right side of the handle from the serving surface (41); an incised line bisecting the left and right serving surfaces (40) extending from the central focus point (50) to a point bisecting the anterior sides (45); an anterior side (430) extending from the point bisecting the anterior sides (45) to the right anterior apex (420); an anterior side (330) extending from the point bisecting the anterior sides (45) to the left anterior apex (320); and either an unserrated side (410) extending from the right handle termination point (42) to a right anterior apex (420) or a serrated side (310) extending from the right handle termination point (42) to a right anterior apex (420).

The left serving surface (30) of FIG. 8 has boundaries that are comprised of the incised line bisecting the left side of the handle from the serving surface (61); an incised line bisecting the left and right serving surfaces (40) extending from the central focus point (50) to a point bisecting the anterior sides (45); an anterior side (430) extending from the point bisecting the anterior sides (45) to the right anterior apex (420); an anterior side (330) extending from the point bisecting the anterior sides (45) to the left anterior apex (320); and either an unserrated side (410) extending from the left handle termination point (62) to a left anterior apex (320) or a serrated side (310) extending from left handle termination point (62) to a left anterior apex (320).

Seventh Exemplary Embodiment: A Foldable Serving Scoop

Figure 15:
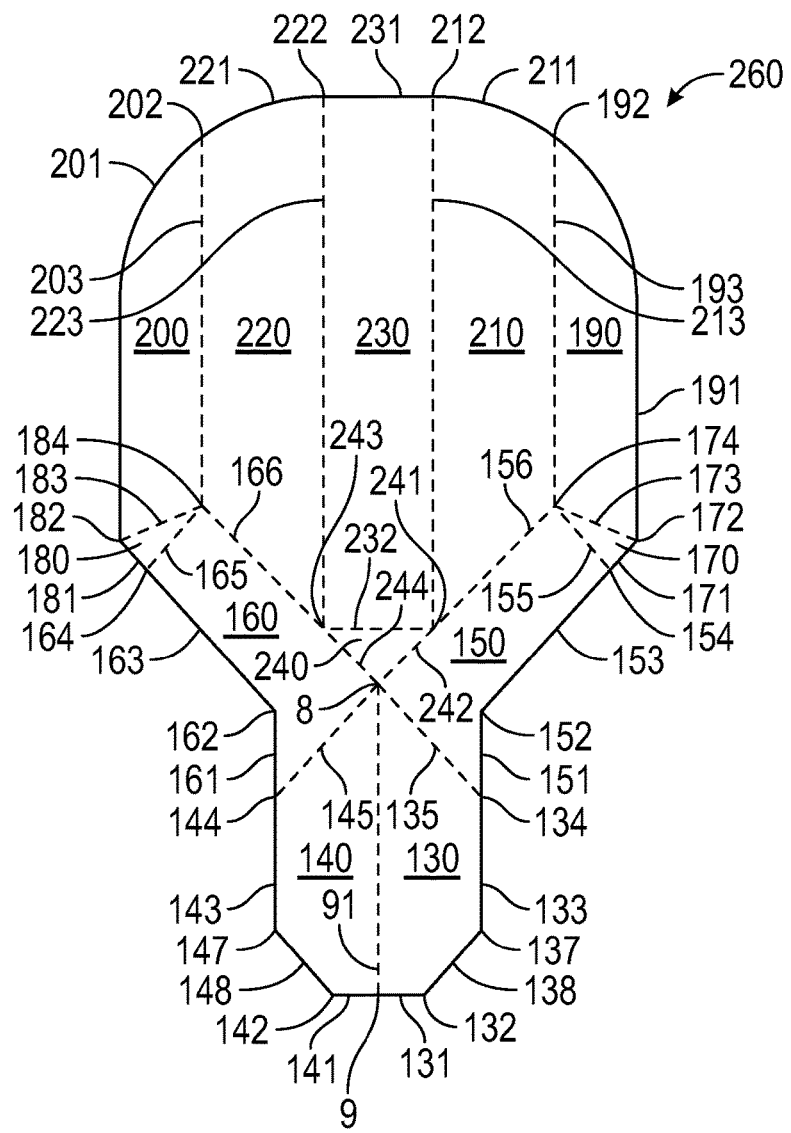
FIG. 15 is a top plan view of an embodiment, in one form, of a partially serrated foldable serving utensil that can, optionally, be integrated into a pizza box.

FIG. 15 discloses an apparatus known as a foldable serving scoop (260). The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 15 represents an incised, scored or perforated line that will allow the bendable material to easily bend along such line.

FIG. 15 shows a foldable handle, at least part of which is capable of being folded into a plane that is perpendicular to an anterior center serving surface (230), the foldable handle comprising a right handle folding piece (130), a left handle folding piece (140) and a handle bisecting incised line (91).

The posterior right handle folding piece (130) disclosed in FIG. 15 has boundaries that are comprised of a handle bisecting incised line (91); a right posterior side (131) extending from the posterior handle bisecting point (9) to a right posterior apex (132); a right posterior sloping side (138) extending from the right posterior apex (132) to an apex of the right posterior sloping side (137); a right side (133) extending from the apex of the right posterior sloping side (137) to a right handle anterior apex (134); and an incised anterior boundary of the right handle folding piece (135) extending from the right handle anterior apex (134) to the central focus point (8).

The a left handle folding piece (140)) disclosed in FIG. 15 has boundaries that are comprised of the handle bisecting incised line (91); a left posterior side (141) extending from the posterior handle bisecting point (9) to a left posterior apex (142); a left posterior sloping side (148) extending from the left posterior apex (142) to an apex of the left posterior sloping side (147); a left side (143) extending from the apex of the left posterior sloping side (147) to a left handle anterior apex (144); and an incised anterior boundary of the left handle folding piece (145) extending from the left handle anterior apex (144) to the central focus point (8).

The handle bisecting incised line (91) disclosed in FIG. 15 extends from a posterior handle bisecting point (9) to a central focus point (8).

The exemplary embodiment shown in FIG. 15 also discloses a plurality of posterior side pieces: a right posterior side piece (150) and a left posterior side piece (160).

The right posterior side piece (150) depicted in FIG. 15 is comprised of the incised anterior boundary of the right handle folding piece (135); a right posterior perimetric side (151) extending from the right handle anterior apex (134) to an anterior apex of the right posterior perimetric side (152); a right middle perimetric side (153) extending from the anterior apex of the right posterior perimetric side (152) to an anterior apex of the right middle perimetric side (154); a right anterior perimetric side (155) extending from the anterior apex of the right middle perimetric side (154) to a left anterior apex (174) of a right flexing surface (170); a left anterior perimetric side (156) extending from the left anterior apex (174) of the right flexing surface (170) to a right anterior apex of a posterior center serving surface (241); and a right posterior side (242) of the posterior center serving surface (240) extending from a right anterior apex of the posterior center serving surface (241) to the central focus point (8).

The left posterior side piece (160) depicted in FIG. 15 is comprised of the incised anterior boundary of the left handle folding piece (145); a left posterior perimetric side (161) extending from the left handle anterior apex (144) to an anterior apex of the left posterior perimetric side (162); a left middle perimetric side (163) extending from the anterior apex of the left posterior perimetric side (162) to an anterior apex of the left middle perimetric side (164); a left anterior perimetric side (165) extending from the anterior apex of the left middle perimetric side (164) to a right anterior apex (184) of a left flexing surface (180); a right anterior perimetric side (166) extending from the right anterior apex (184) of the left flexing surface (180) to a left anterior apex of a posterior center serving surface (243); and a left posterior side (244) of the posterior center serving surface (240) extending from a left anterior apex of the posterior center serving surface (243) to the central focus point (8).

The exemplary embodiment shown in FIG. 15 also discloses a plurality of flexing surfaces: a right flexing surface (170) and a left flexing surface (180).

The right flexing surface (170) depicted in FIG. 15 adjoins the right posterior side piece (150) and a right folding surface (190) and is comprised of the right anterior perimetric side (155) of the right posterior side piece (150); a right posterior perimetric side (171) extending from the anterior apex of the right middle perimetric side (154) to a right anterior apex (172); and a front perimetric side (173) extending from the right anterior apex (172) to a left anterior apex (174).

The left flexing surface (180) depicted in FIG. 15 adjoins the left posterior side piece (160) and a left folding surface (200) and is comprised of the left anterior perimetric side (165) of the left posterior side piece (160); a left posterior perimetric side (181) extending from the anterior apex of the left middle perimetric side (164) to a left anterior apex (182); and a front perimetric side (183) extending from the left anterior apex (182) to a right anterior apex (184).

The exemplary embodiment shown in FIG. 15 also discloses a plurality of folding surfaces: a right folding surface (190) and a left folding surface (200).

The right folding surface (190) depicted in FIG. 15 adjoins the right flexing surface (170) and a right serving surface (210) and is comprised of the front perimetric side (173) of the right flexing surface (170); a left side (193) extending from the left anterior apex (174) of the right flexing surface (170); and a right and front perimetric side (191) extending from the right anterior apex (172) of the right flexing surface (170) to a left front apex (192).

The left folding surface (200) depicted in FIG. 15 adjoins the left flexing surface (180) and a left serving surface (220) and is comprised of the front perimetric side (183) of the left flexing surface (180); a right side (203) extending from the right anterior apex (184) of the left flexing surface (180); and a left and front perimetric side (201) extending from the left anterior apex (182) of the left flexing surface (180) to a right front apex (202).

The exemplary embodiment shown in FIG. 15 also discloses a plurality of serving surfaces: a right serving surface (210), a left serving surface (220), an anterior center serving surface (230) and a posterior center serving surface (240).

The right serving surface (210) depicted in FIG. 15 adjoins the right folding surface (190), the right posterior side piece (150) and an anterior center serving surface (230), the right serving surface (210) and is comprised of the left side (193) of the right folding surface (190); the left anterior perimetric side (156) extending from the left anterior apex (174) of the right flexing surface (170) to the right anterior apex of the posterior center serving surface (241); an incised line bounding the right and the anterior center serving surfaces (213), the incised line extending from the right anterior apex of the posterior center serving surface (241) to a bisecting point between the right and the anterior center serving surfaces (212); and an anterior perimetric side (211) extending from the bisecting point between the right and the anterior center serving surfaces (212) to the left front apex (192) of the right folding surface (190).

The left serving surface (220) depicted in FIG. 15 adjoins the left folding surface (200), the left posterior side piece (160) and an anterior center serving surface (230), the left serving surface (220) is comprised of the right side (203) of the left folding surface (200); the right anterior perimetric side (166) extending from the right anterior apex (184) of the left flexing surface (180) to the left anterior apex of the posterior center serving surface (243); an incised line bounding the left and the anterior center serving surfaces (223), the incised line extending from the left anterior apex of the posterior center serving surface (243) to a bisecting point between the left and the anterior center serving surfaces (222); and an anterior perimetric side (221) extending from the bisecting point between the left and the anterior center serving surfaces (222) to the right front apex (202) of the left folding surface (200).

The anterior center serving surface (230) is depicted in FIG. 15 as bounded posteriorly by an incised line bounding the anterior and posterior serving surfaces (232), bounded on the right by the incised line bounding the right and the anterior center serving surfaces (213), bounded on the left by the incised line bounding the left and the anterior center serving surfaces (223) and bounded anteriorly by an anterior perimetric side (231) extending from the bisecting point between the right and the anterior center serving surfaces (212) to the bisecting point between the left and the anterior center serving surfaces (222).

The posterior center serving surface (240) is depicted in FIG. 15 as bounded anteriorly by the anterior center serving surface (230), and posteriorly by the right posterior side (242) extending from a right anterior apex of the posterior center serving surface (241) to the central focus point (8) and by the left posterior side (244) extending from a left anterior apex of the posterior center serving surface (243) to the central focus point (8).

Figure 16:
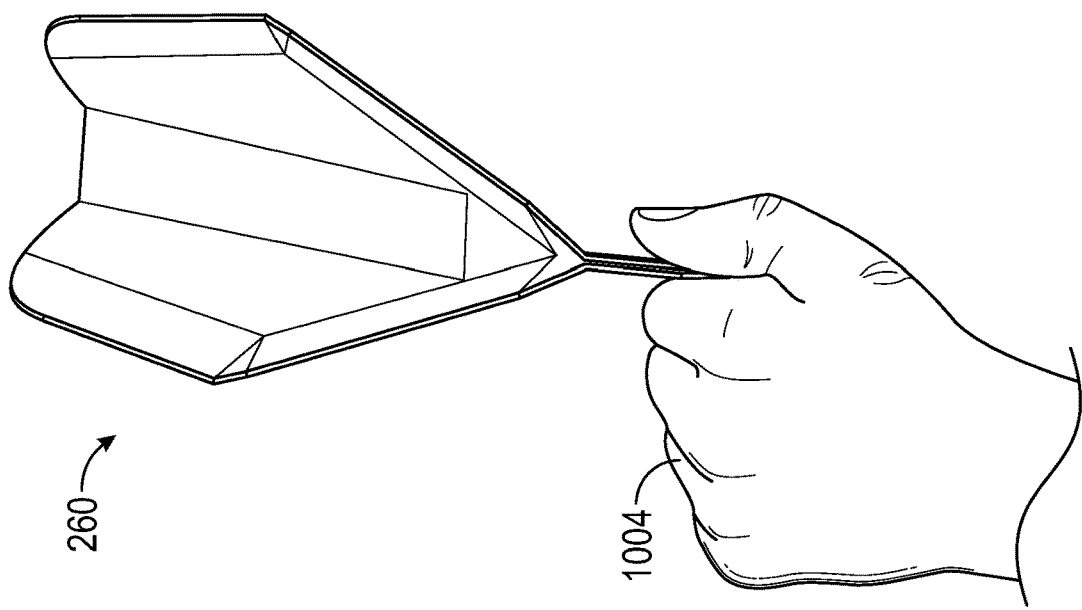
FIG. 16 is a rear top perspective view of a human hand holding an embodiment, in one form, of a foldable serving scoop.

FIG. 16 illustrates a rear top perspective view of a human hand (1004) holding an embodiment, in one form, of a foldable serving scoop (260). By pushing the right handle folding piece (130) and the left handle folding piece (140) that are depicted in FIG. 15, the user can create the three dimensional foldable serving scoop (260) that is shown in FIG. 16.

Figure 17:
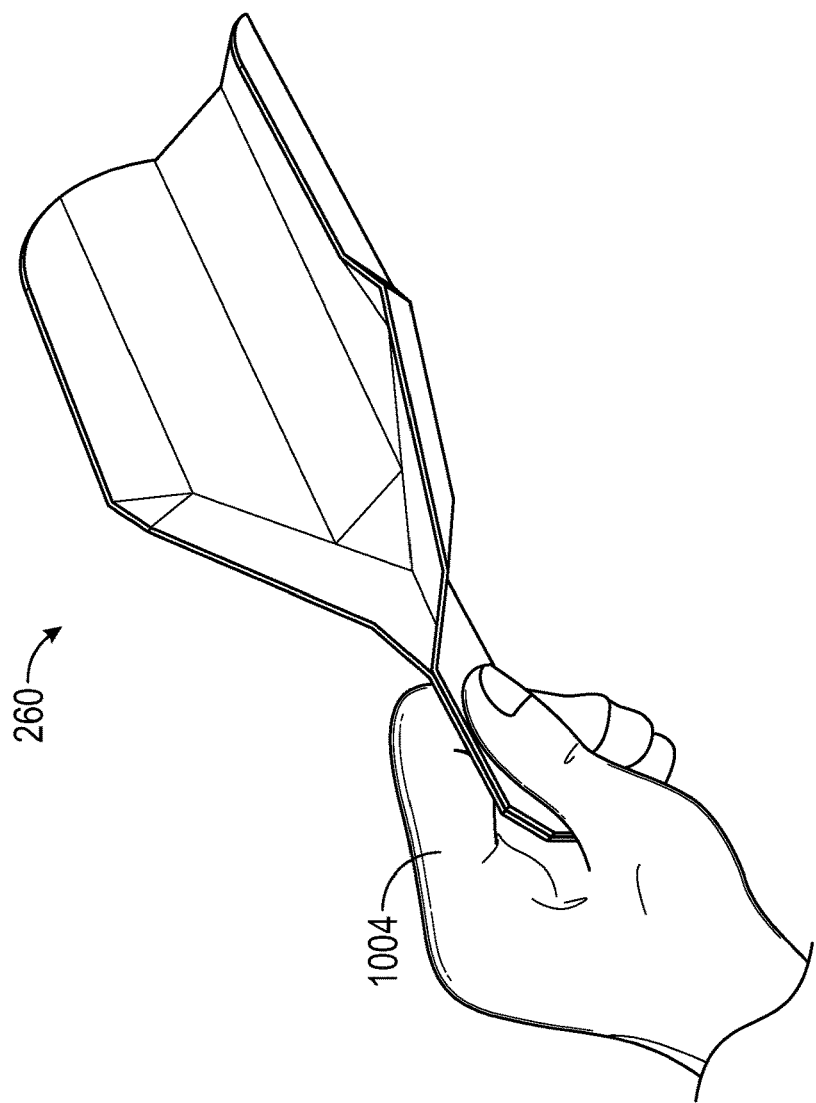
FIG. 17 is a top right rear perspective view of a human hand holding an embodiment, in one form, of a foldable serving scoop.

FIG. 17 is a top right rear perspective view of a human hand holding an embodiment, in one form, of a partially serrated foldable serving utensil. This is a different perspective of the exemplary embodiment depicted in FIG. 16.

Eighth Exemplary Embodiment: Foldable Serving Utensils with Sharp Edges

Figure 12:
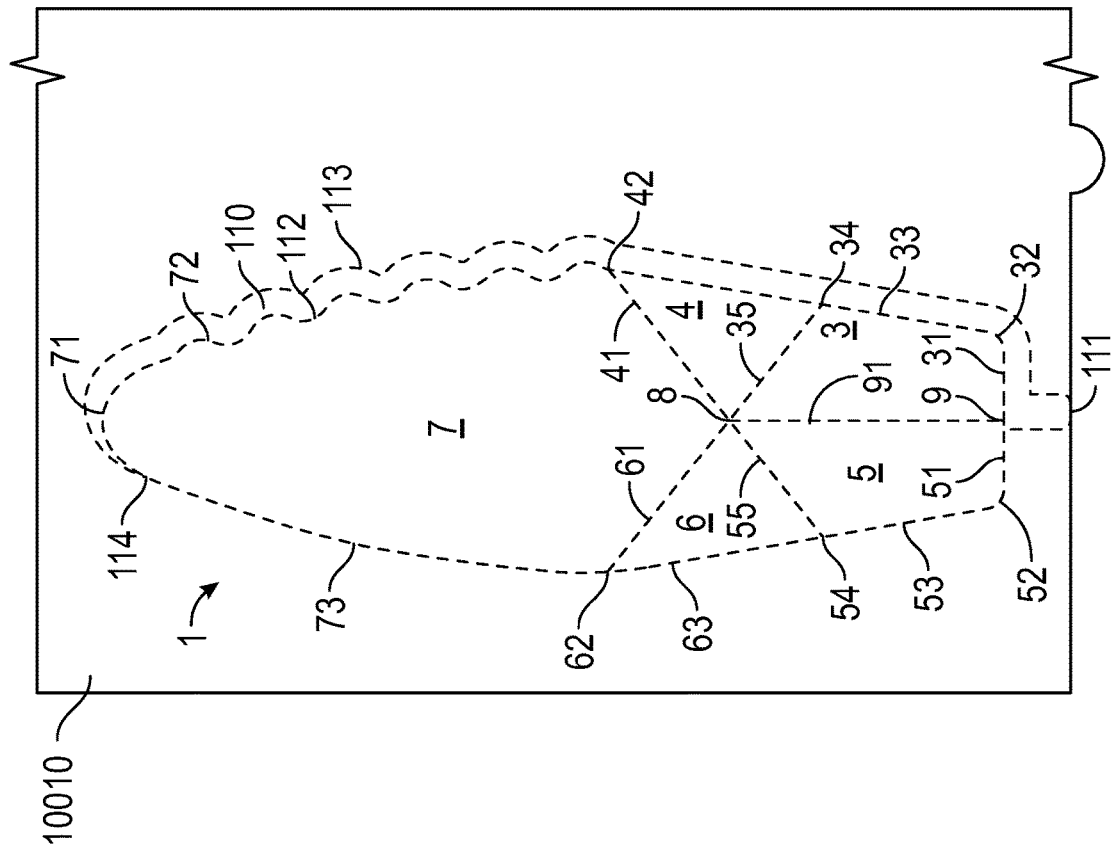
FIG. 12 is a top plan view of an embodiment, in one form, of a partially serrated foldable serving utensil that can be integrated into a pizza box and that can be removed from the pizza box using a rip strip.
Figure 13:
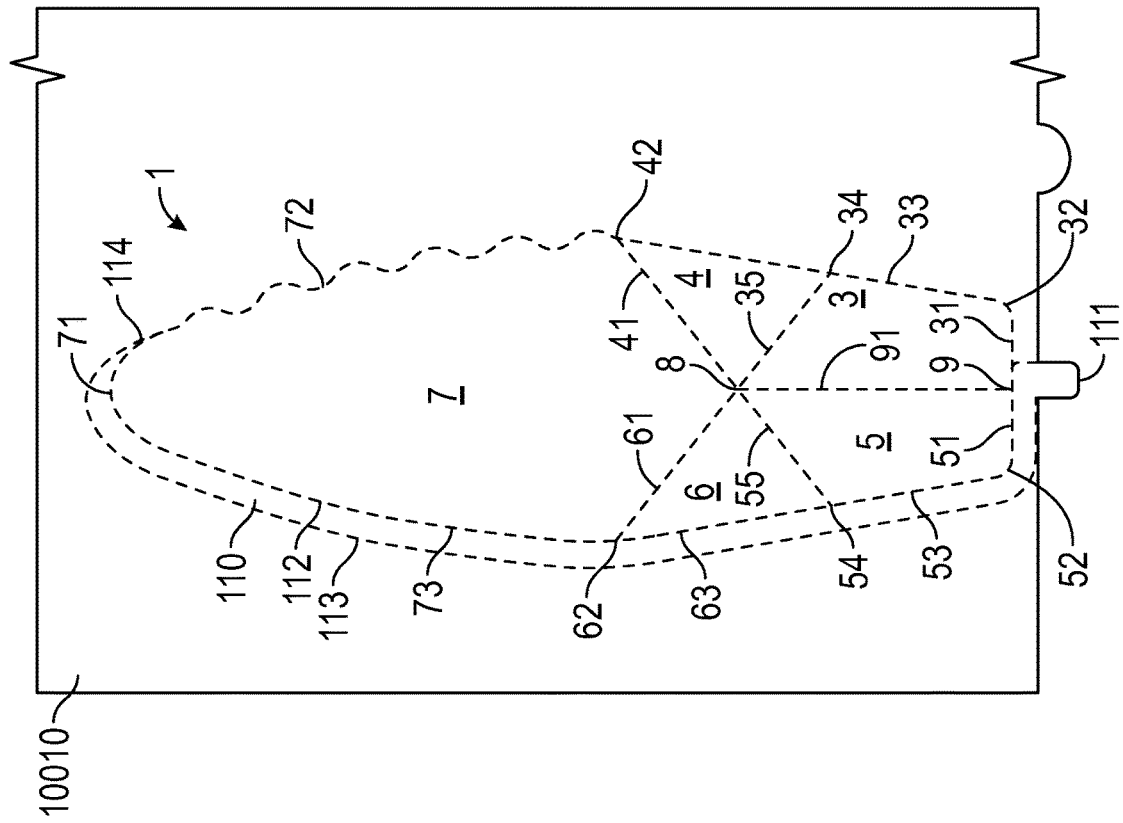
FIG. 13 is a top plan view of an embodiment, in one form, of a partially serrated foldable serving utensil that can be integrated into a pizza box and that can be removed from the pizza box using a rip strip.
Figure 14:
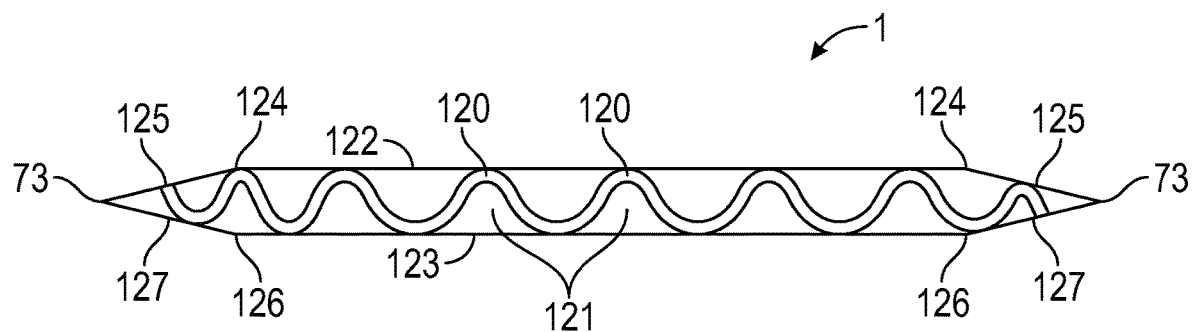
FIG. 14 is a cross-sectional view of an embodiment, in one form, of a partially serrated foldable serving utensil.

FIG. 14 discloses a cross-sectional view of an embodiment, in one form, of a partially serrated foldable serving utensil, such as, for example, those exemplary embodiments disclosed in FIGS. 1, 5, 7, 8, 9, 10, 11, 12 and 13. However, the design depicted in FIG. 14 is not limited to partially serrated foldable serving utensils, but may also be applied to a folding spatula with serrations on a plurality of sides (such as the exemplary embodiment depicted in FIG. 3) or to an unserrated folding spatula (such as the exemplary embodiment depicted in FIG. 4).

The addition of sharp edges adds utility by allowing serving utensils such as, for example, spatulas, to be used as more than mere instruments to move food from one surface to another; with the sharp edges they may also now be used as cutting implements. Additionally, adding sharp edges allows serving utensils such as, for example, spatulas, to be more easily punched out or otherwise removed from a box lid or other planar surface when incorporated therein, such as, for example, the embodiments shown in FIGS. 9, 10, 11, 12 and 13.

FIG. 14 illustrates an exemplary embodiment wherein around the periphery of an apparatus (such as, for example, those disclosed in FIGS. 1, 3, 4, 5, 7, 8, 9, 10, 11, 12 and 13) the thickness of the bendable material of which the apparatus is comprised is such that on the top surface (122) of the bendable material, there is a downward inflection point (124) and a downward sloping top surface (125); on the bottom surface (123) there is an upward inflection point (126) and an upward sloping bottom surface (127); and the bendable material forms a pointed edge where the downward sloping top surface (125) meets the upward sloping bottom surface (127).

Figure 10:
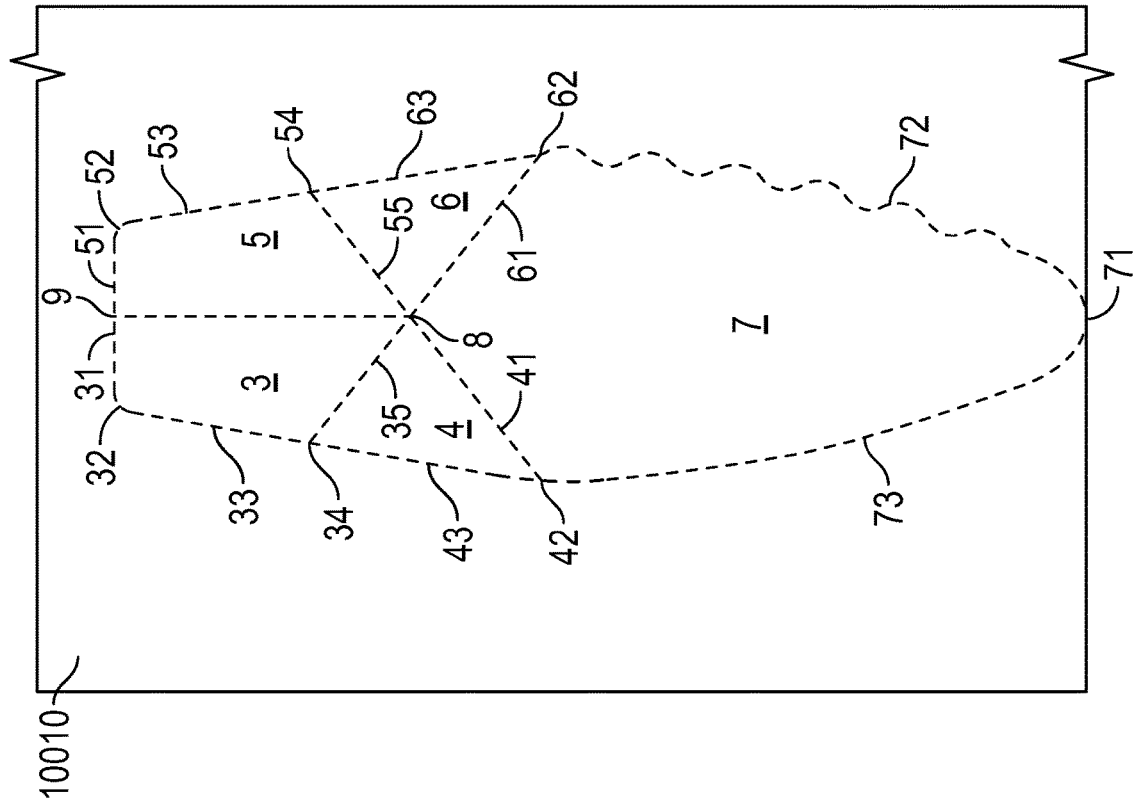
FIG. 10 is a top plan view of an embodiment, in one form, of a pizza box with an integrated partially serrated foldable serving utensil.

Ninth Exemplary Embodiment: Foldable Serving Utensils Integrated into Box Lids and Containers FIG. 10 depicts the integration of the First Exemplary Embodiment, i.e., a partially serrated foldable serving utensil, into the lid of a pizza box. The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 10 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Figure 9:
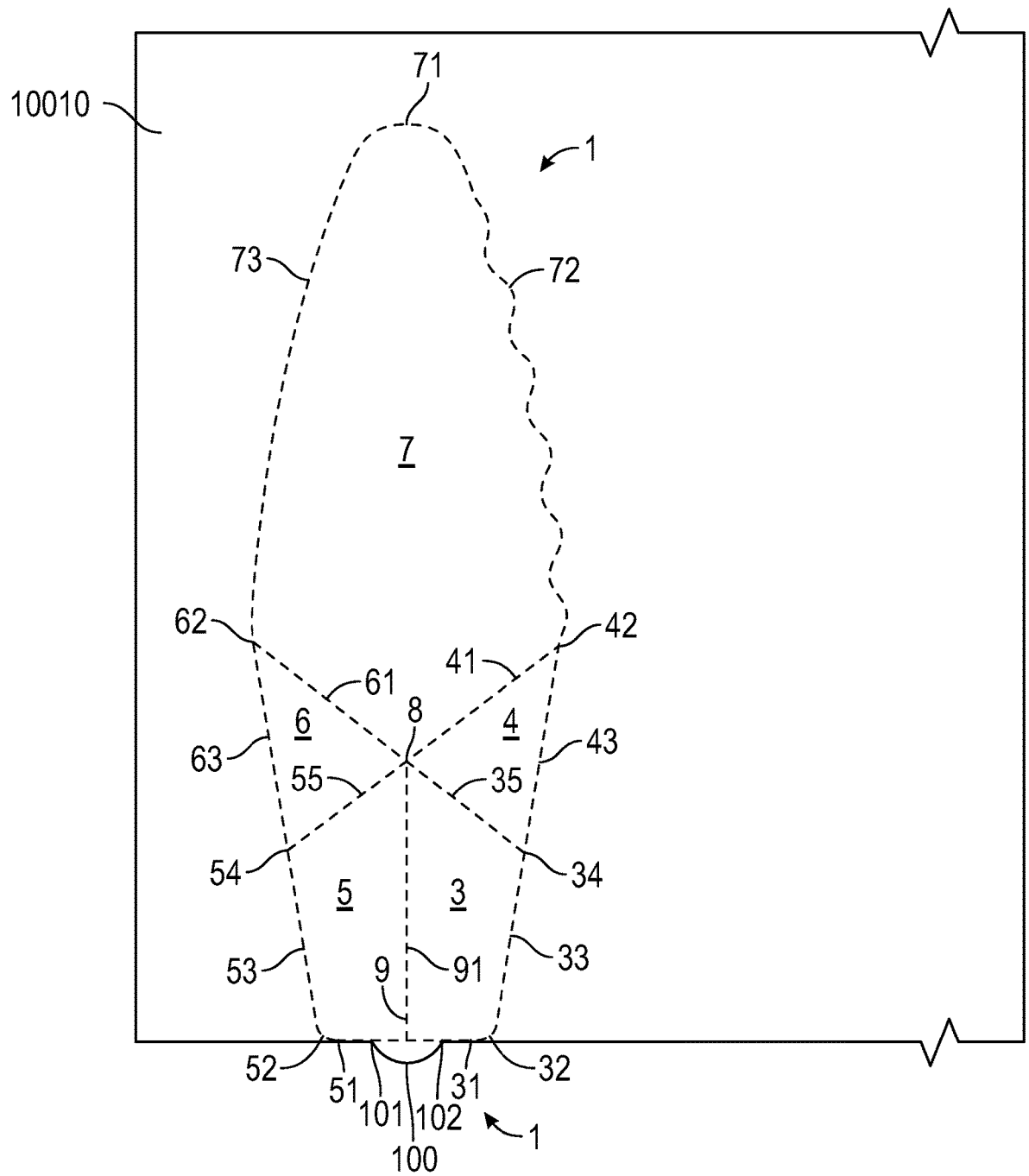
FIG. 9 is a top plan view of an embodiment, in one form, of a pizza box with an integrated partially serrated foldable serving utensil.

Tenth Exemplary Embodiment: A Partially Serrated Folding Spatula with a Handle Tab Integrated into Box Lids and Containers FIG. 9 illustrates the First Exemplary Embodiment integrated into a pizza box lid, wherein the apparatus of the First Exemplary Embodiment is modified to further comprise a tab (100) extending outward perimetrically from a left base of the tab (101) located on the left posterior side (51) to a right base of the tab (102) on the right posterior side (31).

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG.

9 represents an incised, scored or perforated line that will allow the bendable material to easily bend along such line.

It should be noted that the integration of foldable serving utensils is not limited to either the partially serrated foldable serving utensil described in the First Exemplary Embodiment, the Tenth Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Figure 11:
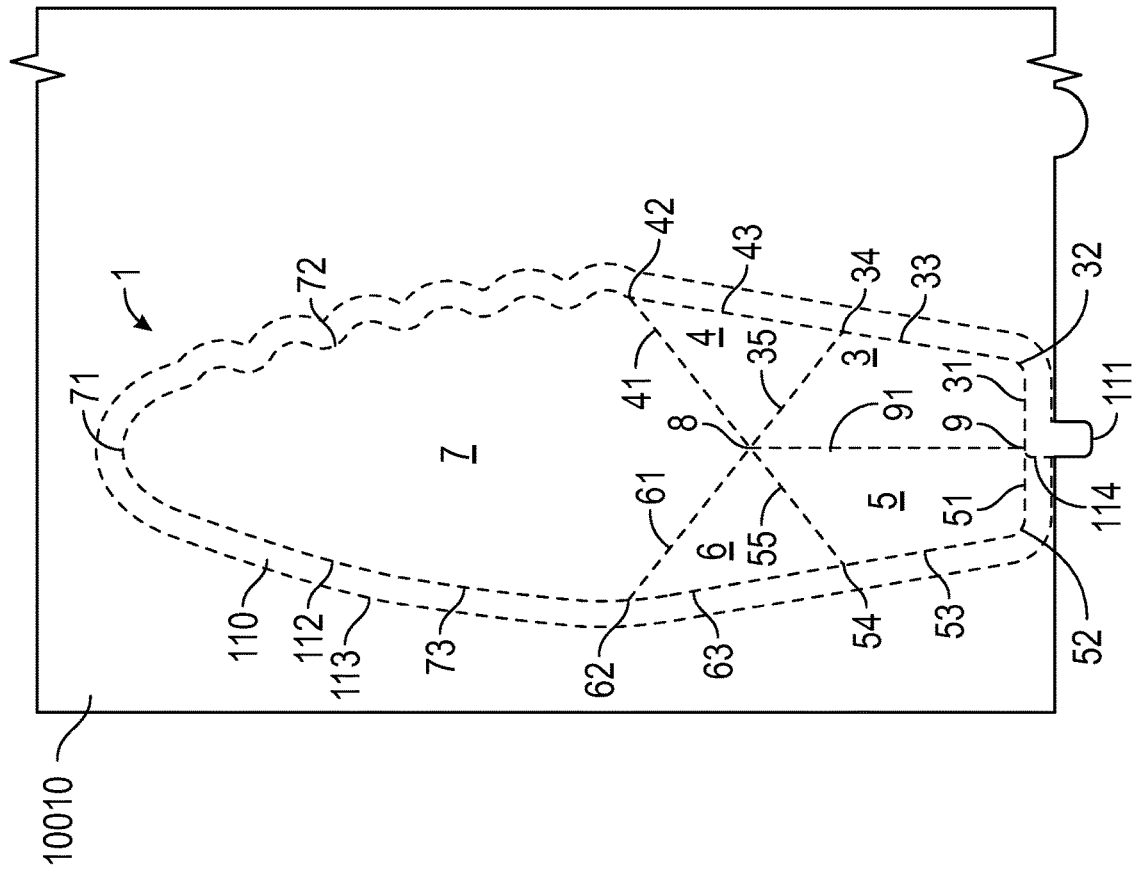
FIG. 11 is a top plan view of an embodiment, in one form, of a pizza box with an integrated partially serrated foldable serving utensil that can be removed from the pizza box using a rip strip.

Eleventh Exemplary Embodiment: A Partially Serrated Folding Spatula Integrated into Box Lids and Containers by a Surrounding Rip Strip FIG. 11 illustrates the First Exemplary Embodiment integrated into a planar lid or planar surface of a box or other container (10010), the outer periphery of said apparatus being wholly surrounded by a rip strip (110), said rip strip comprising a grab tab (111); an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114).

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 11 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Twelfth Exemplary Embodiment: A Partially Serrated Folding Spatula Integrated into Box Lids and Containers by a Surrounding Rip Strip that Protrudes Outward from the Edge of the Planar Surface FIG. 11 illustrates the First Exemplary Embodiment integrated into a planar lid or planar surface of a box or other container (10010), the outer periphery of said apparatus being wholly surrounded by a rip strip (110), said rip strip comprising a grab tab (111) that protrudes outward from the edge of the planar lid to allow the grab tab (111) to be grasped without touching the planar lid; an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114).

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 11 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Thirteenth Exemplary Embodiment: A Partially Serrated Folding Spatula Integrated into Box Lids and Containers by a Surrounding Rip Strip Whose Grab Tab is Part of the Edge of the Planar Surface In some instances it may be desirable to completely surround a foldable serving utensil such as, for instance, the partially serrated folding spatula described as the First Exemplary Embodiment, with a rip strip, to incorporate the foldable serving utensil into the planar surface of a box lid or of a container and to position the foldable serving utensil such that the grab tab (111) of the rip strip (110) is flush with the edge of the planar surface. An example of such positioning is illustrated in FIG. 13 for another exemplary embodiment.

The Thirteenth Exemplary Embodiment thus describes foldable serving utensils such as, for instance, the apparatuses of the First, Second, Third, Fourth, Fifth, Sixth, Seventh or Eighth Exemplary Embodiments integrated into the planar lid or planar surface of a box or other container (10010), the outer periphery of said apparatus being wholly surrounded by a rip strip (110), said rip strip comprising a grab tab (111) that is a part of the edge of the planar lid; an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114).

The disclosed apparatus may be comprised of bendable material that can be incised, scored, perforated and folded such as, for example, cardboard. The disclosed apparatus can further be created out of boxes, containers or a blank of bendable material.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Fourteenth Exemplary Embodiment: A Partially Serrated Folding Spatula Integrated into Box Lids and Containers and Partially Bounded by a Rip Strip FIGS. 12 and 13 illustrate the First Exemplary Embodiment integrated into the planar lid or planar surface of a box or other container (10010), the outer periphery of said apparatus being partially bounded by a rip strip (110), said rip strip comprising a grab tab (111); an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114); and the outer periphery of said apparatus that is not adjacent to the rip strip (110) being incised, scored or perforated to allow removal of the apparatus from the planar lid.

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIGS. 12 and 13 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Fifteenth Exemplary Embodiment: A Partially Serrated Folding Spatula Integrated into Box Lids and Containers Partially Bounded by a Rip Strip that Protrudes Outward from the Edge of the Planar Surface FIG. 12 illustrates the First Exemplary Embodiment integrated into the planar lid or planar surface of a box or other container (10010), the outer periphery of said apparatus being partially bounded by a rip strip (110), said rip strip comprising a grab tab (111) that protrudes outward from the edge of the planar lid to allow the grab tab (111) to be grasped without touching the planar lid; an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114); and the outer periphery of said apparatus that is not adjacent to the rip strip (110) being incised, scored or perforated to allow removal of the apparatus from the planar lid.

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 12 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

Sixteenth Exemplary Embodiment: A Partially Serrated Folding Spatula Integrated into Box Lids and Containers Partially Bounded by a Rip Strip Whose Grab Tab is Part of the Edge of the Planar Surface In some instances it may be desirable to completely surround a foldable serving utensil such as, for instance, the partially serrated folding spatula described as the First Exemplary Embodiment, with a partial rip strip that does not entirely encompass the utensil, to incorporate the foldable serving utensil into the planar surface of a box lid or of a container and to position the foldable serving utensil such that the grab tab (111) of the rip strip (110) is flush with the edge of the planar surface. An example of such positioning is illustrated in FIG. 13.

FIG. 13 illustrates the First Exemplary Embodiment integrated into the planar lid or planar surface of a box or other container (10010), the outer periphery of said apparatus being partially bounded by a rip strip (110), said rip strip comprising a grab tab (111) that is a part of the edge of the planar lid; an incised, scored or perforated line bounding the apparatus (112) extending from the grab tab (111) to the end of the strip (114); and an outer perimetric boundary (113) bounding the planar lid of the box or other container and extending from the grab tab (111) to the end of the strip (114); and the outer periphery of said apparatus that is not adjacent to the rip strip (110) being incised, scored or perforated to allow removal of the apparatus from the planar lid.

The disclosed apparatus may be comprised of bendable material that can be incised, scored, perforated and folded such as, for example, cardboard. The disclosed apparatus can further be created out of boxes, containers or a blank of bendable material. Each of the dashed lines shown in FIG. 13 represents an incised, scored or perforated line that will allow the bendable material to easily bend along such line.

It should be noted that the integration of foldable serving utensils is not limited to either the partially serrated foldable serving utensil described in the First Exemplary Embodiment or to the lid of a pizza box. Any other foldable utensils that are claimed or described in this application may also be integrated into not only a pizza box lid, but also into any planar lid of a box or other container when the outer periphery of the foldable utensil is incised, scored or perforated to allow its removal from the planar lid or surface.

While the present exemplary embodiments are shown in the drawings and fully described above with particularity and detail, it will be apparent to those of ordinary skill in the art that many modifications thereof may be made without departing from the principles and concepts set forth herein, including, but not limited to, variations in size, materials, shape, form, function and manner of operation, assembly, and use.

Hence, the proper scope of the present application should be determined only by the appended claims to encompass all such modifications as well as all relationships equivalent to those illustrated in the drawings and described in the specification.

Finally, the reader should note that the purpose of the annexed Abstract is to enable various patent offices throughout the world, the public generally, and especially the scientists, engineers, and practitioners in the art who are not familiar with patent or legal terms or phraseology, to determine quickly from a cursory inspection the nature and essence of the technical disclosure of this application. Accordingly, the Abstract is not intended to define the invention or the application, which are defined only by the claims, and the Abstract is not intended to limit the scope of the invention in any way.

The following claims define the invention in which an exclusive right is claimed:

1. An apparatus, known as a partially serrated folding spatula, comprised of bendable material that can be incised, scored, perforated and folded and that can be created out of boxes, containers or a blank of bendable material, said apparatus further comprising:
- a foldable handle, at least part of which is capable of being folded into a plane that is perpendicular to a serving surface, the foldable handle comprising
  - a handle bisecting incised line extending from a posterior handle bisecting point to a central focus point;
  - a posterior right handle folding piece whose boundaries comprise:
    - the handle bisecting incised line;
    - a right posterior side extending from the posterior handle bisecting point to a right posterior apex;
    - a right side extending from the right posterior apex to a right handle bisecting point; and
    - an incised line bisecting the right handle folding pieces extending from the right handle bisecting point to the central focus point;
  - an anterior right handle folding piece whose boundaries comprise:
    - the incised line bisecting the right handle folding pieces;
    - an incised line bisecting the right side of the handle from the serving surface, said incised line extending from the central focus point to a right handle termination point; and
    - a right side extending from the right handle termination point to the right handle bisecting point;
  - a posterior left handle folding piece whose boundaries comprise:
    - the handle bisecting incised line;
    - a left posterior side extending from the posterior handle bisecting point to
    - a left posterior apex;
    - a left side extending from the left posterior apex to a left handle bisecting point; and
    - an incised line bisecting the left handle folding pieces extending from the left handle bisecting point to the central focus point;
  - an anterior left handle folding piece whose boundaries comprise:
    - the incised line bisecting the left handle folding pieces;
    - an incised line bisecting the left side of the handle from the serving surface, said incised line extending from the central focus point to a left handle termination point; and
    - a left side extending from the left handle termination point to the left handle bisecting point;
  - the serving surface whose boundaries comprise:
    - the incised line bisecting the right side of the handle from the serving surface;
    - the incised line bisecting the left side of the handle from the serving surface;
    - an edge with serrations extending from either the right handle termination point to an anterior apex or from the left handle termination point to the anterior apex; and
    - a nonserrated edge extending from either the right handle termination point to an anterior apex or from the left handle termination point to the anterior apex, whichever is not an edge with serrations; and
  - the central focus point which is comprised of endpoints of:
    - the handle bisecting incised line;
    - the incised line bisecting the right handle folding pieces;
    - the incised line bisecting the right side of the handle from the serving surface;
    - the incised line bisecting the left handle folding pieces; and
    - the incised line bisecting the left side of the handle from the serving surface.

2. An apparatus, known as a folding spatula with serrations on two sides, comprised of bendable material that can be incised, scored, perforated and folded and that can be created out of boxes, containers or a blank of bendable material, said apparatus further comprising:
- a foldable handle, at least part of which is capable of being folded into a plane that is perpendicular to a serving surface, the foldable handle comprising
  - a handle bisecting incised line extending from a posterior handle bisecting point to a central focus point;
  - a posterior right handle folding piece whose boundaries comprise:
    - the handle bisecting incised line;
    - a right posterior side extending from the posterior handle bisecting point to a right posterior apex;
    - a right side extending from the right posterior apex to a right handle bisecting point; and
    - an incised line bisecting the right handle folding pieces extending from the right handle bisecting point to the central focus point;
  - an anterior right handle folding piece whose boundaries comprise:
    - the incised line bisecting the right handle folding pieces;
    - an incised line bisecting the right side of the handle from the serving surface, said incised line extending from the central focus point to a right handle termination point; and
    - a right side extending from the right handle termination point to the right handle bisecting point;
  - a posterior left handle folding piece whose boundaries comprise:
    - the handle bisecting incised line;
    - a left posterior side extending from the posterior handle bisecting point to a left posterior apex;
    - a left side extending from the left posterior apex to a left handle bisecting point; and
    - an incised line bisecting the left handle folding pieces extending from the left handle bisecting point to the central focus point;
  - an anterior left handle folding piece whose boundaries comprise:
    - the incised line bisecting the left handle folding pieces;
    - an incised line bisecting the left side of the handle from the serving surface, said incised line extending from the central focus point to a left handle termination point; and
    - a left side extending from the left handle termination point to the left handle bisecting point;
  - the serving surface whose boundaries comprise:
    - the incised line bisecting the right side of the handle from the serving surface;
    - the incised line bisecting the left side of the handle from the serving surface;
    - an edge with serrations extending from the right handle termination point to an anterior apex; and
    - an edge with serrations extending from the left handle termination point to the anterior apex; and
  - the central focus point which is comprised of endpoints of:

the handle bisecting incised line;
the incised line bisecting the right handle folding pieces;
the incised line bisecting the right side of the handle from the serving surface;
the incised line bisecting the left handle folding pieces; and
the incised line bisecting the left side of the handle from the serving surface.

3. An apparatus, known as an unserrated folding spatula, comprised of bendable material that can be incised, scored, perforated and folded and that can be created out of boxes, containers or a blank of bendable material, said apparatus further comprising:
  a foldable handle, at least part of which is capable of being folded into a plane that is perpendicular to a serving surface, the foldable handle comprising
    a handle bisecting incised line extending from a posterior handle bisecting point to a central focus point;
    a posterior right handle folding piece whose boundaries comprise:
      the handle bisecting incised line;
      a right posterior side extending from the posterior handle bisecting point to a right posterior apex;
      a right side extending from the right posterior apex to a right handle bisecting point; and
      an incised line bisecting the right handle folding pieces extending from the right handle bisecting point to the central focus point;
    an anterior right handle folding piece whose boundaries comprise:
      the incised line bisecting the right handle folding pieces;
      an incised line bisecting the right side of the handle from the serving surface, said incised line extending from the central focus point to a right handle termination point; and
      a right side extending from the right handle termination point to the right handle bisecting point;
    a posterior left handle folding piece whose boundaries comprise:
      the handle bisecting incised line;
      a left posterior side extending from the posterior handle bisecting point to a left posterior apex;
      a left side extending from the left posterior apex to a left handle bisecting point; and
      an incised line bisecting the left handle folding pieces extending from the left handle bisecting point to the central focus point;
    an anterior left handle folding piece whose boundaries comprise:
      the incised line bisecting the left handle folding pieces;
      an incised line bisecting the left side of the handle from the serving surface, said incised line extending from the central focus point to a left handle termination point; and
      a left side extending from the left handle termination point to the left handle bisecting point;
  the serving surface whose boundaries comprise:
    the incised line bisecting the right side of the handle from the serving surface;
    the incised line bisecting the left side of the handle from the serving surface;
    a nonserrated edge extending from the right handle termination point to an anterior apex; and
    a nonserrated edge extending from the left handle termination point to the anterior apex; and
  the central focus point which is comprised of endpoints of:
    the handle bisecting incised line;
    the incised line bisecting the right handle folding pieces;
    the incised line bisecting the right side of the handle from the serving surface;
    the incised line bisecting the left handle folding pieces; and
    the incised line bisecting the left side of the handle from the serving surface.

4. An apparatus, known as a folding spatula with a split handle, comprised of bendable material that can be incised, scored, perforated and folded and that can be created out of boxes, containers or a blank of bendable material, said apparatus further comprising:
  a foldable handle, at least part of which is capable of being folded into a plane that is perpendicular to a serving surface, the foldable handle comprising
    a cut bisecting the posterior handle folding pieces extending from a posterior handle bisecting point to a central focus point;
    a posterior right handle folding piece whose boundaries comprise:
      the cut bisecting the posterior handle folding pieces;
      a right posterior side extending from the posterior handle bisecting point to a right posterior apex;
      a right side extending from the right posterior apex to a right handle bisecting point; and
      an incised line bisecting the right handle folding pieces extending from the right handle bisecting point to the central focus point;
    an anterior right handle folding piece whose boundaries comprise:
      the incised line bisecting the right handle folding pieces;
      an incised line bisecting the right side of the handle from the serving surface, said incised line extending from the central focus point to a right handle termination point; and
      a right side extending from the right handle termination point to the right handle bisecting point;
    a posterior left handle folding piece whose boundaries comprise:
      the cut bisecting the posterior handle folding pieces;
      a left posterior side extending from the posterior handle bisecting point to a left posterior apex;
      a left side extending from the left posterior apex to a left handle bisecting point; and
      an incised line bisecting the left handle folding pieces extending from the left handle bisecting point to the central focus point;
    an anterior left handle folding piece whose boundaries comprise:
      the incised line bisecting the left handle folding pieces;
      an incised line bisecting the left side of the handle from the serving surface, said incised line extending from the central focus point to a left handle termination point; and
      a left side extending from the left handle termination point to the left handle bisecting point;
  the serving surface whose boundaries comprise:
    the incised line bisecting the right side of the handle from the serving surface;

the incised line bisecting the left side of the handle from the serving surface;
an edge with serrations extending from either the right handle termination point to an anterior apex or from the left handle termination point to the anterior apex; and
a nonserrated edge extending from either the right handle termination point to an anterior apex or from the left handle termination point to the anterior apex, whichever is not an edge with serrations; and
the central focus point which is comprised of endpoints of:
the cut bisecting the posterior handle folding pieces;
the incised line bisecting the right handle folding pieces;
the incised line bisecting the right side of the handle from the serving surface;
the incised line bisecting the left handle folding pieces; and
the incised line bisecting the left side of the handle from the serving surface.

5. An apparatus, known as a folding bull-nosed spatula, comprised of bendable material that can be incised, scored, perforated and folded and that can be created out of boxes, containers or a blank of bendable material, said apparatus further comprising:
a foldable handle, at least part of which is capable of being folded into a plane that is perpendicular to a serving surface bisecting incised line, the foldable handle comprising
a handle bisecting incised line extending from a posterior handle bisecting point to a central focus point;
a posterior right handle folding piece whose boundaries comprise:
the handle bisecting incised line;
a right posterior side extending from the posterior handle bisecting point to a right posterior apex;
a right side extending from the right posterior apex to a right handle bisecting point; and
an incised line bisecting the right handle folding pieces extending from the right handle bisecting point to the central focus point;
an anterior right handle folding piece whose boundaries comprise:
the incised line bisecting the right handle folding pieces;
an incised line bisecting the right side of the handle from the serving surface, said incised line extending from the central focus point to a right handle termination point; and
a right side extending from the right handle termination point to the right handle bisecting point;
a posterior left handle folding piece whose boundaries comprise:
the handle bisecting incised line;
a left posterior side extending from the posterior handle bisecting point to a left posterior apex;
a left side extending from the left posterior apex to a left handle bisecting point; and
an incised line bisecting the left handle folding pieces extending from the left handle bisecting point to the central focus point;
an anterior left handle folding piece whose boundaries comprise:
the incised line bisecting the left handle folding pieces;
an incised line bisecting the left side of the handle from the serving surface, said incised line extending from the central focus point to a left handle termination point; and
a left side extending from the left handle termination point to the left handle bisecting point;
a right serving surface whose boundaries comprise:
the incised line bisecting the right side of the handle from the serving surface;
the serving surface bisecting incised line extending from the central focus point to a point bisecting the anterior sides;
an anterior right perimetric side extending from the point bisecting the anterior sides to the right anterior apex; and
either an unserrated side extending from the right handle termination point to a right anterior apex or a serrated side extending from the right handle termination point to a right anterior apex; and
a left serving surface whose boundaries comprise:
the incised line bisecting the left side of the handle from the serving surface;
the serving surface bisecting incised line extending from the central focus point to a point bisecting the anterior sides;
anterior left perimetric side extending from the point bisecting the anterior sides to the left anterior apex; and
either an unserrated side extending from the left handle termination point to the left anterior apex or a serrated side extending from the left handle termination point to the left anterior apex.

6. An apparatus, known as a folding flat-nosed spatula, comprised of bendable material that can be incised, scored, perforated and folded and that can be created out of boxes, containers or a blank of bendable material, said apparatus further comprising:
a foldable handle, at least part of which is capable of being folded into a plane that is perpendicular to an incised line bisecting the left and right serving surfaces, the foldable handle comprising
a handle bisecting incised line extending from a posterior handle bisecting point to a central focus point;
a posterior right handle folding piece whose boundaries comprise:
the handle bisecting incised line;
a right posterior side extending from the posterior handle bisecting point to a right posterior apex;
a right side extending from the right posterior apex to a right handle bisecting point; and
an incised line bisecting the right handle folding pieces extending from the right handle bisecting point to the central focus point;
an anterior right handle folding piece whose boundaries comprise:
the incised line bisecting the right handle folding pieces;
an incised line bisecting the right side of the handle from the serving surface, said incised line extending from the central focus point to a right handle termination point; and
a right side extending from the right handle termination point to the right handle bisecting point;
a posterior left handle folding piece whose boundaries comprise:
the handle bisecting incised line;

a left posterior side extending from the posterior handle bisecting point to a left posterior apex;

a left side extending from the left posterior apex to a left handle bisecting point; and an incised line bisecting the left handle folding pieces extending from the left handle bisecting point to the central focus point;

an anterior left handle folding piece whose boundaries comprise:

the incised line bisecting the left handle folding pieces;

an incised line bisecting the left side of the handle from the serving surface, said incised line extending from the central focus point to a left handle termination point; and a left side extending from the left handle termination point to the left handle bisecting point;

a right serving surface whose boundaries comprise:

the incised line bisecting the right side of the handle from the serving surface;

an incised line bisecting the left and right serving surfaces extending from the central focus point to a point bisecting the anterior sides;

an anterior side extending from the point bisecting the anterior sides to the right anterior apex;

an anterior side extending from the point bisecting the anterior sides to the left anterior apex; and either an unserrated side extending from the right handle termination point to a right anterior apex or a serrated side extending from the right handle termination point to a right anterior apex; and a left serving surface whose boundaries comprise:

the incised line bisecting the left side of the handle from the serving surface;

an incised line bisecting the left and right serving surfaces extending from the central focus point to a point bisecting the anterior sides;

an anterior side extending from the point bisecting the anterior sides to the right anterior apex;

an anterior side extending from the point bisecting the anterior sides to the left anterior apex; and either an unserrated side extending from the left handle termination point to a left anterior apex or a serrated side extending from the left handle termination point to a left anterior apex.

7. An apparatus, known as a foldable serving scoop, comprised of bendable material that can be incised, scored, perforated and folded and that can be created out of boxes, containers or a blank of bendable material, said apparatus further comprising:

a foldable handle, at least part of which is capable of being folded into a plane that is perpendicular to an anterior center serving surface, the foldable handle comprising a handle bisecting incised line extending from a posterior handle bisecting point to a central focus point;

a right handle folding piece whose boundaries comprise:

the handle bisecting incised line;

a right posterior side extending from the posterior handle bisecting point to a right posterior apex;

a right posterior sloping side extending from the right posterior apex to an apex of the right posterior sloping side;

a right side extending from the apex of the right posterior sloping side to a right handle anterior apex; and an incised anterior boundary of the right handle folding piece extending from the right handle anterior apex to the central focus point;

a left handle folding piece whose boundaries comprise:

the handle bisecting incised line;

a left posterior side extending from the posterior handle bisecting point to a left posterior apex;

a left posterior sloping side extending from the left posterior apex to an apex of the left posterior sloping side;

a left side extending from the apex of the left posterior sloping side to a left handle anterior apex; and an incised anterior boundary of the left handle folding piece extending from the left handle anterior apex to the central focus point;

a right posterior side piece comprising:

the incised anterior boundary of the right handle folding piece;

a right posterior perimetric side extending from the right handle anterior apex to an anterior apex of the right posterior perimetric side;

a right middle perimetric side extending from the anterior apex of the right posterior perimetric side to an anterior apex of the right middle perimetric side;

a right anterior perimetric side extending from the anterior apex of the right middle perimetric side to a left anterior apex of a right flexing surface;

a left anterior perimetric side extending from the left anterior apex of the right flexing surface to a right anterior apex of a posterior center serving surface; and a right posterior side of the posterior center serving surface extending from a right anterior apex of the posterior center serving surface to the central focus point;

a left posterior side piece comprising:

the incised anterior boundary of the left handle folding piece;

a left posterior perimetric side extending from the left handle anterior apex to an anterior apex of the left posterior perimetric side;

a left middle perimetric side extending from the anterior apex of the left posterior perimetric side to an anterior apex of the left middle perimetric side;

a left anterior perimetric side extending from the anterior apex of the left middle perimetric side to a right anterior apex of a left flexing surface;

a right anterior perimetric side extending from the right anterior apex of the left flexing surface to a left anterior apex of a posterior center serving surface; and a left posterior side of the posterior center serving surface extending from a left anterior apex of the posterior center serving surface to the central focus point;

a right flexing surface adjoining the right posterior side piece and a right folding surface, the right flexing surface comprising:

the right anterior perimetric side of the right posterior side piece;

a right posterior perimetric side extending from the anterior apex of the right middle perimetric side to a right anterior apex; and a front perimetric side extending from the right anterior apex to a left anterior apex;

a left flexing surface adjoining the left posterior side piece and a left folding surface, the left flexing surface comprising:
   the left anterior perimetric side of the left posterior side piece;
   a left posterior perimetric side extending from the anterior apex of the left middle perimetric side to a left anterior apex; and
   a front perimetric side extending from the left anterior apex to a right anterior apex;
a right folding surface adjoining the right flexing surface and a right serving surface, the right folding surface comprising:
   the front perimetric side of the right flexing surface;
   a left side extending from the left anterior apex of the right flexing surface; and
   a right and front perimetric side extending from the right anterior apex of the right flexing surface to a left front apex;
a left folding surface adjoining the left flexing surface and a left serving surface, the left folding surface comprising:
   the front perimetric side of the left flexing surface;
   a right side extending from the right anterior apex of the left flexing surface; and
   a left and front perimetric side extending from the left anterior apex of the left flexing surface to a right front apex;
the right serving surface adjoining the right folding surface, the right posterior side piece and an anterior center serving surface, the right serving surface comprising:
   the left side of the right folding surface;
   the left anterior perimetric side extending from the left anterior apex of the right flexing surface to the right anterior apex of the posterior center serving surface;
   an incised line bounding the right and the anterior center serving surfaces, the incised line extending from the right anterior apex of the posterior center serving surface to a bisecting point between the right and the anterior center serving surfaces; and
   an anterior perimetric side extending from the bisecting point between the right and the anterior center serving surfaces to the left front apex of the right folding surface;
the left serving surface adjoining the left folding surface, the left posterior side piece and an anterior center serving surface, the left serving surface comprising:
   the right side of the left folding surface;
   the right anterior perimetric side extending from the right anterior apex of the left flexing surface to the left anterior apex of the posterior center serving surface;
   an incised line bounding the left and the anterior center serving surfaces, the incised line extending from the left anterior apex of the posterior center serving surface to a bisecting point between the left and the anterior center serving surfaces; and
   an anterior perimetric side extending from the bisecting point between the left and the anterior center serving surfaces to the right front apex of the left folding surface;
the anterior center serving surface, bounded posteriorly by an incised line bounding the anterior and posterior serving surfaces, bounded on the right by the incised line bounding the right and the anterior center serving surfaces, bounded on the left by the incised line bounding the left and the anterior center serving surfaces and bounded anteriorly by an anterior perimetric side extending from the bisecting point between the right and the anterior center serving surfaces to the bisecting point between the left and the anterior center serving surfaces; and
the posterior center serving surface that is bounded anteriorly by the anterior center serving surface, and posteriorly by
   the right posterior side extending from a right anterior apex of the posterior center serving surface to the central focus point and
   by the left posterior side extending from a left anterior apex of the posterior center serving surface to the central focus point.

8. The apparatus of claim 1, 2, 3, 4, 5, 6 or 7 wherein around the periphery of the apparatus the thickness of the bendable material of which the apparatus is comprised is such that
   on the top surface of the bendable material, there is a downward inflection point and a downward sloping top surface;
   on the bottom surface there is an upward inflection point and an upward sloping bottom surface; and
   the bendable material forms a pointed edge where the downward sloping top surface meets the upward sloping bottom surface.

9. The apparatus of claim 1, 2, 3, 4, 5, 6, 7 or 8 integrated into the planar lid or planar surface of a box or other container, the outer periphery of said apparatus being incised, scored or perforated to allow removal of the apparatus from the planar lid or surface.

10. The apparatus of claim 1, 2, 3, 4, 5, 6, 7 or 8 integrated into the planar lid or planar surface of a box or other container, the outer periphery of said apparatus being incised, scored or perforated to allow removal of the apparatus from the planar lid, said apparatuses further comprising a tab extending outward perimetrically from a left base of the tab located on the left posterior side to a right base of the tab on the right posterior side.

11. The apparatus of claim 1, 2, 3, 4, 5, 6, 7 or 8 integrated into the planar lid or planar surface of a box or other container, the outer periphery of said apparatus being wholly surrounded by a rip strip, said rip strip comprising:
   a grab tab;
   an incised, scored or perforated line bounding the apparatus extending from the grab tab to the end of the strip; and
   an outer perimetric boundary bounding the planar lid of the box or other container and extending from the grab tab to the end of the strip.

12. The apparatus of claim 1, 2, 3, 4, 5, 6, 7 or 8 integrated into the planar lid or planar surface of a box or other container, the outer periphery of said apparatus being wholly surrounded by a rip strip, said rip strip comprising:
   a grab tab that protrudes outward from the edge of the planar lid to allow the grab tab to be grasped without touching the planar lid;
   an incised, scored or perforated line bounding the apparatus extending from the grab tab to the end of the strip; and
   an outer perimetric boundary bounding the planar lid of the box or other container and extending from the grab tab to the end of the strip.

13. The apparatus of claim 1, 2, 3, 4, 5, 6, 7 or 8 integrated into the planar lid or planar surface of a box or other container, the outer periphery of said apparatus being wholly surrounded by a rip strip, said rip strip comprising:
- a grab tab that is a part of the edge of the planar lid;
- an incised, scored or perforated line bounding the apparatus extending from the grab tab to the end of the strip; and
- an outer perimetric boundary bounding the planar lid of the box or other container and extending from the grab tab to the end of the strip.

14. The apparatus of claim 1, 2, 3, 4, 5, 6, 7 or 8 integrated into the planar lid or planar surface of a box or other container, the outer periphery of said apparatus being partially bounded by a rip strip, said rip strip comprising:
- a grab tab;
- an incised, scored or perforated line bounding the apparatus extending from the grab tab to the end of the strip; and
- an outer perimetric boundary bounding the planar lid of the box or other container and extending from the grab tab to the end of the strip; and
- the outer periphery of said apparatus that is not adjacent to the rip strip being incised, scored or perforated to allow removal of the apparatus from the planar lid.

15. The apparatus of claim 1, 2, 3, 4, 5, 6, 7 or 8 integrated into the planar lid or planar surface of a box or other container, the outer periphery of said apparatus being partially bounded by a rip strip, said rip strip comprising:
- a grab tab that protrudes outward from the edge of the planar lid to allow the grab tab to be grasped without touching the planar lid;
- an incised, scored or perforated line bounding the apparatus extending from the grab tab to the end of the strip; and
- an outer perimetric boundary bounding the planar lid of the box or other container and extending from the grab tab to the end of the strip; and
- the outer periphery of said apparatus that is not adjacent to the rip strip being incised, scored or perforated to allow removal of the apparatus from the planar lid.

16. The apparatus of claim 1, 2, 3, 4, 5, 6, 7 or 8 integrated into the planar lid or planar surface of a box or other container, the outer periphery of said apparatus being partially bounded by a rip strip, said rip strip comprising:
- a grab tab that is a part of the edge of the planar lid;
- an incised, scored or perforated line bounding the apparatus extending from the grab tab to the end of the strip; and
- an outer perimetric boundary bounding the planar lid of the box or other container and extending from the grab tab to the end of the strip; and
- the outer periphery of said apparatus that is not adjacent to the rip strip being incised, scored or perforated to allow removal of the apparatus from the planar lid.

\* \* \* \* \*